US012580481B2

(12) United States Patent
Ji et al.

(10) Patent No.: US 12,580,481 B2
(45) Date of Patent: Mar. 17, 2026

(54) RESONANT SWITCHED CAPACITOR CONVERTER

(71) Applicant: Renesas Electronics America Inc., Milpitas, CA (US)

(72) Inventors: Fei Ji, Princeton, NJ (US); Shea Lynn Petricek, Austin, TX (US)

(73) Assignee: Renesas Electronics America Inc., Milpitas, CA (US)

( * ) Notice: Subject to any disclaimer, the term of this patent is extended or adjusted under 35 U.S.C. 154(b) by 147 days.

(21) Appl. No.: 18/324,396

(22) Filed: May 26, 2023

(65) Prior Publication Data

US 2024/0396451 A1 Nov. 28, 2024

(51) Int. Cl.
*H02M 3/07* (2006.01)
*H02M 3/00* (2006.01)
H02M 1/00 (2006.01)

(52) U.S. Cl.
CPC .............. *H02M 3/07* (2013.01); *H02M 3/01* (2021.05); *H02M 1/0058* (2021.05)

(58) Field of Classification Search
CPC ............................................. H02M 3/07–078
See application file for complete search history.

(56) References Cited

U.S. PATENT DOCUMENTS

| | | | | |
|---|---|---|---|---|
| 11,362,576 B1 * | 6/2022 | Rizzolatti | ............... | H02M 3/07 |
| 2024/0055990 A1 * | 2/2024 | Kawano | .............. | H02M 3/1584 |

OTHER PUBLICATIONS

Cheng Li et al; "A Switched Capacitor and Autotransformer Hybrid Converter With DC Current in the Windings" IEEE Transactions on Power Electronics, vol. 37, No. 2, Feb. 2022, pp. 1870-1884.
Hong Huang; "Designing an LLC Resonant Half-Bridge Power Converter" 2010 Texas Instruments Power Supply Design Seminar SEM1900, Topic 3 TI Literature No. SLUP263. https://www.ti.com/seclit/ml/slup263/slup263.pdf.
EeNews Europe "LLC synchronous rectification made easy, robust and more efficient" Technology News, Jun. 7, 2015. 22 pages. https://www.eenewseurope.com/en/llc-synchronous-rectification-made-easy-robust-and-more-efficient/.

* cited by examiner

*Primary Examiner* — Peter M Novak
(74) *Attorney, Agent, or Firm* — SCULLY, SCOTT, MURPHY & PRESSER, P.C

(57) ABSTRACT

A DC-DC power converter has a ground terminal, an input terminal for receiving an input voltage and an output terminal for providing an output voltage with a target conversion ratio. The power converter includes a coupled inductor having a first winding and a second winding coupled to the output terminal; a first flying capacitor coupled to a first inductor and to the second winding; a second flying capacitor coupled to a second inductor and to the first winding; an input capacitor coupling the input terminal to the ground terminal; an output capacitor coupling the output terminal to the ground terminal; a network of switches; and a driver adapted to drive the network of switches with a sequence of states during a drive period, wherein the sequence of states forms a switching cycle.

17 Claims, 14 Drawing Sheets

400

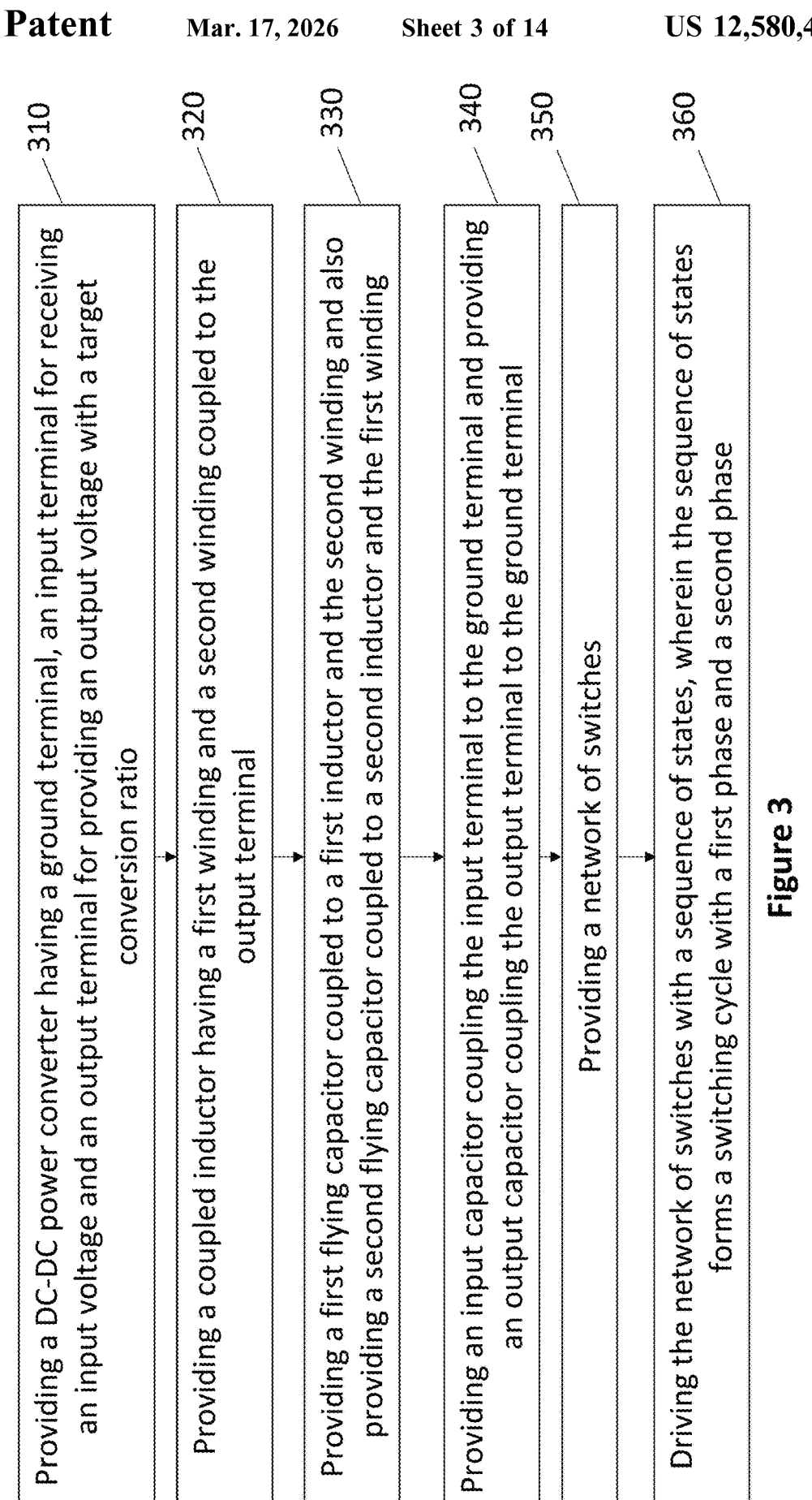

310 Providing a DC-DC power converter having a ground terminal, an input terminal for receiving an input voltage and an output terminal for providing an output voltage with a target conversion ratio 320 Providing a coupled inductor having a first winding and a second winding coupled to the output terminal 330 Providing a first flying capacitor coupled to a first inductor and the second winding and also providing a second flying capacitor coupled to a second inductor and the first winding 340 Providing an input capacitor coupling the input terminal to the ground terminal and providing an output capacitor coupling the output terminal to the ground terminal 350 Providing a network of switches 360 Driving the network of switches with a sequence of states, wherein the sequence of states forms a switching cycle with a first phase and a second phase

PWMA $f_r$

The max on time is equals to the $T_r/2$

| | RSCC | | LLC | |
|---|---|---|---|---|
| | Voltage stress | RMS Current | Voltage stress | RMS Current |
| S1/S2 | $V_{dc}$ (1/2$V_{dc}$ stable) | $\frac{1}{4} I_{rms}$ | $V_{in}$ | $\frac{1}{4} I_{rms}$ |
| S3/S4 | $V_{in}$ | $\frac{1}{4} I_{rms}$ | $V_{in}$ | $\frac{1}{4} I_{rms}$ |
| S5/S6 | $2V_{out}$ | | $2V_{out}$ | $\frac{1}{2} I_{rms}$ |
| Cr1/Cr2 | $\frac{1}{2} V_{in}$ | $\frac{1}{4} I_{rms}$ | $\frac{1}{2} V_{in}$ | $\frac{1}{4} I_{rms}$ |
| | Voltage-second | RMS Current | Voltage-second | RMS Current |
| Lr1/Lr2 | $2V_{out}$ | $2\frac{1}{4} I_{rms}$ | $2V_{out}$ | $\frac{1}{2}\frac{1}{4} I_{rms}$ |
| XFMR Lm | $2V_{out}$ | $\frac{1}{2} V_{in} T_s$ | $2V_{out}$ | $\frac{1}{2} V_{in} T_s$ |
| | | | | Average Current |
| XFMR turns | 2:2 | | 4:2:2 | |
| XFMR Tp1/Tp2 | $2V_{out}$ | $\frac{1}{4} I_{rms}$ | $2V_{out}$ | $\frac{1}{2}\frac{1}{4} I_{rms}$ |
| XFMR Ts1/Ts2 | NA | | $2V_{out}$ | $\frac{1}{2} I_{rms}$ |

RESONANT SWITCHED CAPACITOR CONVERTER

TECHNICAL FIELD

The present disclosure relates to a DC-DC power converter and in particular to a resonant switched capacitor converter.

BACKGROUND

In the field of switching converters with relatively high voltage input, the convention is to use either a switched capacitor circuit (SCC) or a series-parallel resonant converter (SPRC) with either a two-inductor, single capacitor (LLC) topology or two-capacitor, single inductor topology (LCC), see for example Hong Huang; "Designing an LLC Resonant Half-Bridge Power Converter" 2010 Texas Instruments Power Supply Design Seminar SEM1900, Topic 3 TI Literature Number: SLUP263.

Transistors can be operated using two conventional switching techniques known as hard-switching and soft-switching. In the hard-switching technique the transistor is turned on and off directly. For instance a voltage is applied to a gate terminal. The drain current and the drain voltage overlap significantly, leading to power dissipation. In the soft-switching technique an external circuit is used to prevent current and voltage waveforms from overlapping during the transistor commutation.

The SCC has several advantages in that it is highly efficient and does not require a transformer. This reduces the production cost of the circuit and decreases the AC winding power loss. A coupled inductor has a 50% reduction in winding loss compared to when using a switching converter with a transformer. However, the SCC utilises a hard-switching technique which decreases the efficiency of the converter. Further, when implementing such a circuit under high frequencies, the SCC can suffer high power loss and the overall design of SCCs means they have a low power density.

On the other hand, LLC/LCC circuits have a high power density as they are operated with a soft-switching technique which is usually implemented as either zero voltage switching (ZVS) or zero current switching (ZCS) for these types of switching converters. The soft-switching technique also has the additional benefits that the converter performs better at higher frequencies due to lower power losses when switching. These LLC/LCC topologies, however, have to be implemented with a resonant tank which includes a transformer in to drive the soft switching. Therefore the average AC current is large, resulting in a high AC winding loss. Furthermore, with ZVS or ZCS it is critical that the turn on/off occurs at the zero crossing point, as a turn on/off that is too early or too late can lead to reduced efficiency.

Typically, the choice of driving control for soft switching is either through sensing the voltage drop at the drain terminal of the switch or through a pulse width clamping method. The first method has the drawback of failing at high current values due to the voltage drop often being quite small whereas the second method requires the use of a resonant tank which requires specific calibration that is time consuming and expensive.

It is an object of the disclosure to address one or more of the above mentioned limitations.

SUMMARY

According to a first aspect of the disclosure, there is provided a DC-DC power converter having a ground terminal, an input terminal for receiving an input voltage and an output terminal for providing an output voltage with a target conversion ratio, the power converter comprising: a coupled inductor having a first winding and a second winding coupled to the output terminal; a first flying capacitor coupled to a first inductor and to the second winding; a second flying capacitor coupled to a second inductor and to the first winding; an input capacitor coupling the input terminal to the ground terminal; an output capacitor coupling the output terminal to the ground terminal; a network of switches; and a driver adapted to drive the network of switches with a sequence of states during a drive period, wherein the sequence of states forms a switching cycle.

Optionally, the switching cycle comprises a first phase and a second phase.

Optionally, the first phase of the switching cycle comprises a first state and a second state; wherein in the first state the input terminal is coupled to the input terminal via a path comprising the first flying capacitor, the first inductor, the second winding, the output capacitor and the input capacitor; and the ground terminal is coupled to the ground terminal via two paths, a first path comprising the second inductor, the second flying capacitor, the second winding, and the output capacitor, and a second path comprising the first winding and the output capacitor; wherein in the second state the input terminal is coupled to the input terminal via a path comprising the second flying capacitor, the second inductor, the first winding, the output capacitor and the input capacitor; and the ground terminal is coupled to the ground terminal via two paths a first path comprising the first inductor, the first flying capacitor, the first winding, and the output capacitor, and a second path comprising the second winding and the output capacitor.

Optionally, the second phase of the switching cycle comprises a third state and a fourth state; wherein in the third state the ground terminal is coupled to the ground terminal via a path comprising the first winding and the output capacitor; wherein in the fourth state the ground terminal is coupled to the ground terminal via a path comprising the second winding and the output capacitor.

Optionally, the network of switches comprises: a first input switch to couple the first flying capacitor to the input terminal; a second input switch to couple the second flying capacitor to the input terminal; a first capacitor switch to couple the first flying capacitor to the first winding; a second capacitor switch to couple the second flying capacitor to the second winding; a first ground switch to couple the first winding to the ground terminal; and a second ground switch to couple the second winding to the ground terminal; wherein each switch in the network of switches is configured to be in either an on-state or an off-state.

Optionally, in the first state the first input switch, the second capacitor switch and the first ground switch are in the on-state, while the second input switch, the first capacitor switch and the second ground switch are in the off-state.

Optionally, in the second state, the first capacitor switch, the second input switch, and the second ground switch are in the on-state and the first input switch, the second capacitor switch and the first ground switch are in the off-state.

Optionally, in the third state the first ground switch is in the on-state and the other remaining switches are in the off-state.

Optionally, in the fourth state the second ground switch is in the on-state and the other remaining switches are in the off-state.

Optionally, the driver is configured to operate in a first mode during the first phase and a second mode during the second phase, wherein the first mode is a soft-switching mode and the second mode is a hard-switching mode.

Optionally, the soft-switching mode is a resonant mode comprising at least one of a zero voltage and a zero current switching mode.

Optionally, the driver is configured to drive the first input switch, the second input switch, the first capacitor switch, and the second capacitor switch using the zero voltage switching; and the first ground switch and the second ground switch using the zero current switching mode.

Optionally, the hard-switching mode comprises a pulse width modulation mode.

Optionally, the driver comprises a controller having a compensator circuit coupled to a pulse width modulation generator configured to generate two pulse width modulation signals; wherein the compensator circuit is configured to receive the output voltage and provide a compensated output voltage signal to the pulse width modulation generator.

Optionally, the first flying capacitor coupled to the first inductor forms a first resonant tank; and wherein the second flying capacitor coupled to the second inductor forms a second resonant tank.

Optionally, the first inductor and the second inductor form a coupled inductor.

Optionally, further comprising a third inductor connected in parallel to the coupled inductor.

According to a second aspect of the disclosure, there is provided a method of operating a DC-DC power converter having a ground terminal, an input terminal for receiving an input voltage and an output terminal for providing an output voltage with a target conversion ratio; the method comprising: providing a coupled inductor having a first winding and a second winding coupled to the output terminal; providing a first flying capacitor coupled to a first inductor and the second winding; providing a second flying capacitor coupled to a second inductor and the first winding; providing an input capacitor coupling the input terminal to the ground terminal; providing an output capacitor coupling the output terminal to the ground terminal; providing a network of switches; driving the network of switches with a sequence of states, wherein the sequence of states forms a switching cycle with a first phase and a second phase.

Optionally, driving the network of switches using with a soft-switching mode during the first phase, and a hard-switching mode during the second phase.

Optionally, the soft-switching mode is a resonant mode, and the hard-switching mode is a pulse width modulation mode.

The options described with respect to the first aspect of the disclosure are also common to the second aspect of the disclosure.

DESCRIPTION OF THE DRAWINGS

The disclosure is described in further detail below by way of example and with reference to the accompanying drawings, in which:

FIG. 3 is a flow chart of a method for operation a resonant switched capacitor converter according to the disclosure;

FIGS. 8A-8C show a comparison of the resonant switched capacitor converter of the present disclosure with a conventional LLC circuit;

DESCRIPTION

Figure 1:
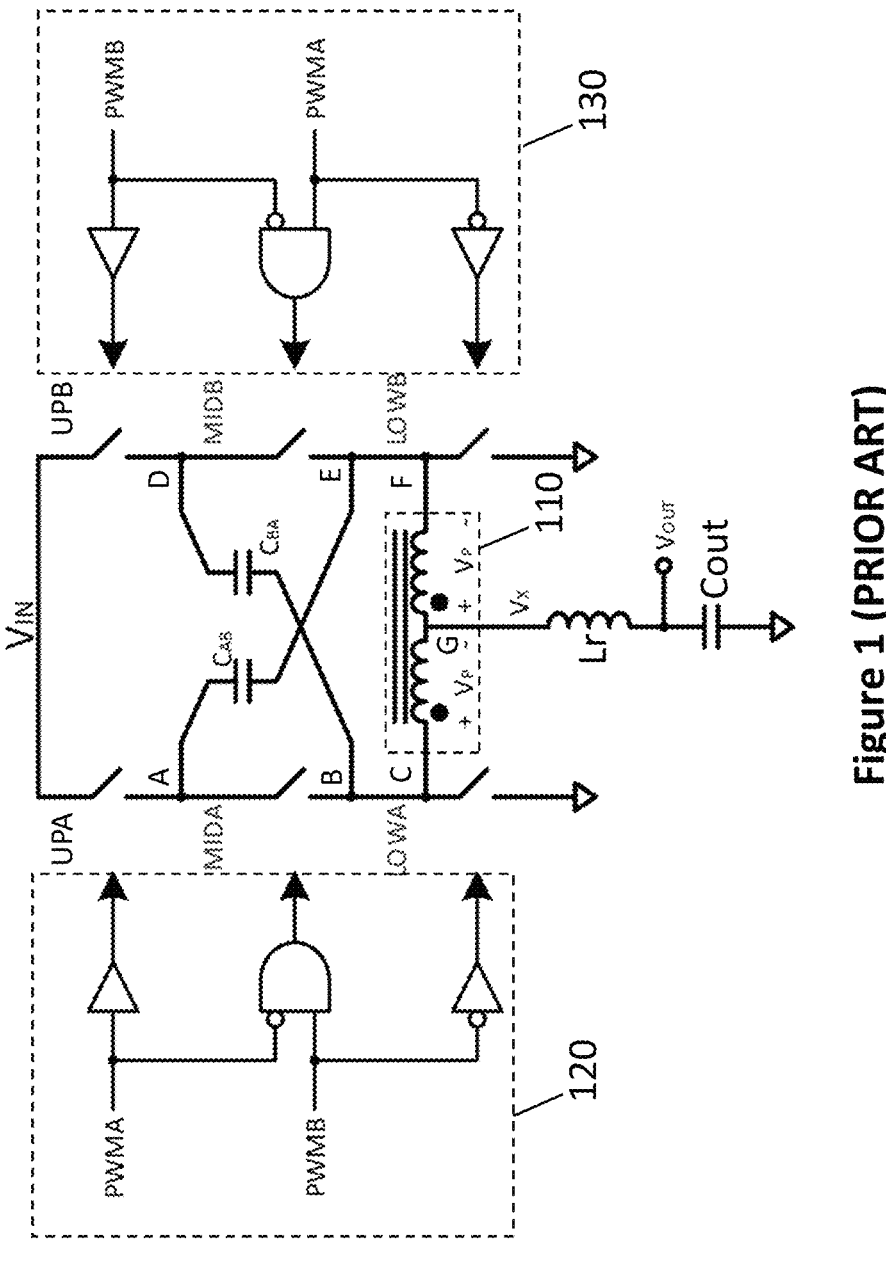
FIG. 1 is a diagram of a switched capacitor converter according to the prior art.

FIG. 1 illustrates a switched capacitor converter (SCC) circuit from the prior art as described in Cheng Li et al; "A Switched Capacitor and Autotransformer Hybrid Converter With DC Current in the Windings" IEEE TRANSACTIONS ON POWER ELECTRONICS, VOL. 37, NO. 2, FEBRUARY 2022. The circuit 100 comprises three pairs of switches: UPA and UPB, MIDA and MIDB, LOWA and LOWB which are operated by a controller with two control panels 120 and 130. The switches UPA, MIDA and LOWA are connected in series at nodes A, B and C. Similarly, the switches UPB, MIDB and LOWB are connected in series at nodes D, E and F. The circuit 100 further comprises a pair of inductors 110 magnetically coupled together, another inductor Lr and three capacitors CAB, CBA and Cout.

The three pairs of switches are connected in parallel with each other and open and close in specific configurations so as to charge and discharge the capacitors in order to either step-up (boost) or step-down (buck) the input voltage Vin. The switches can be, for example, field effect transistors (FETs). The capacitor CAB is coupled between the nodes A and E, whilst the capacitor CBA is coupled between the nodes D and B. The magnetically coupled inductors 110 are connected between the nodes C and F. The pair of inductors 110, is connected to the third inductor Lr at node G. The output port is provided between the output capacitor Cout and Lr.

The control panels 120 and 130 are comprised of a set of logic gates which control each of the pairs of switches. The top switches UPA and UPB are each coupled to a buffer gate, the middle switches MIDA and MIDB are each coupled to a NAND gate and the bottom switches LOWA and LOWB are each connected to a NOT gate. The logic gates receive signals from a controller, which in this example is a pulse width modulation (PWM) controller. The PWM controller has two signals PWMA and PWMB which operate on different duty cycles from each other. For control panel 120, the buffer gate receives an input PWMA and hence UPA is switched on when PWMA signal is on. The NAND gate has two inputs, one to receive PWMA signal and the other to receive the PWMB signal, the output of this NAND gate controls the MIDA switch. MIDA is only turned on when the PWMA is off and PWMB is on. Finally, the NOT gate receives an input signal from PWMB, therefore switch LOWA is only on when PWMB is off. Control panel 130 has the same configuration of logic gates controlling the high, middle and low switches but the input signals for each of these gates is different. The buffer gate receives the PWMB signal, so UPB is only on when PWMB is on. The NAND gate receives input signals from both PWMA and PWMB and the switch MIDB is only on when PWMB is off and PWMA is on. The NOT gate receives signal from PWMA and hence LOWB is on when PWMA is off.

The circuit 100 has four operational states. State 1 occurs when PWMA is on and PWMB is off and state 2 when PWMA is off and PWMB is on. These first two states occur once per cycle regardless of the duty cycle being employed by control signal PWMA. In state 1, UPA, MIDB and LOWA are on and UPB, MIDA and LOWB are off in state 2 the switches that were on in state 1 are off and those that were off in state 1 are now on. These two operational states act as refresh cycles to reset the voltage across the capacitors CAB and CBA. During these states, the current path is such that CAB and CBA are coupled in series to the input voltage Vin. Therefore each capacitor is reset to a voltage roughly equal to Vin/2 and the current flowing through CAB is equal to the negative value of the current flowing through CBA meaning that the overall current is zero and there is no output during these states. The circuit only operates in state 3 if the duty cycle of control signal PWMA is greater than 50% and occurs when both PWMA and PWMB are on. In state 3 only the high switches UPA and UPB are on hence capacitors CAB and CBA are connected in parallel. In this state, the inductor current increases and will subsequently decrease during states 1 and 2. The circuit will only operate in state 4 if the duty cycle of the control signal PWMA is less than 50%. State 4 occurs when both PWMA and PWMB are off and hence only the low switches LOWA and LOWB are on. During this state the current freewheels around the lower switches and the inductor current decreases. Once the circuit 100 passes back into states 1 and/or 2 the current increases again.

The control method employed to operate circuit 100 encounters problems. If the frequency of the PWM is high, then there can be significant power loss caused by the combined parasitic effects of the capacitors and the switches including, for example, leakage current. Another problem is that this control method is a hard-switching technique which means it is difficult to achieve high efficiency with this type of circuit, especially if the load current is low.

Figure 2:
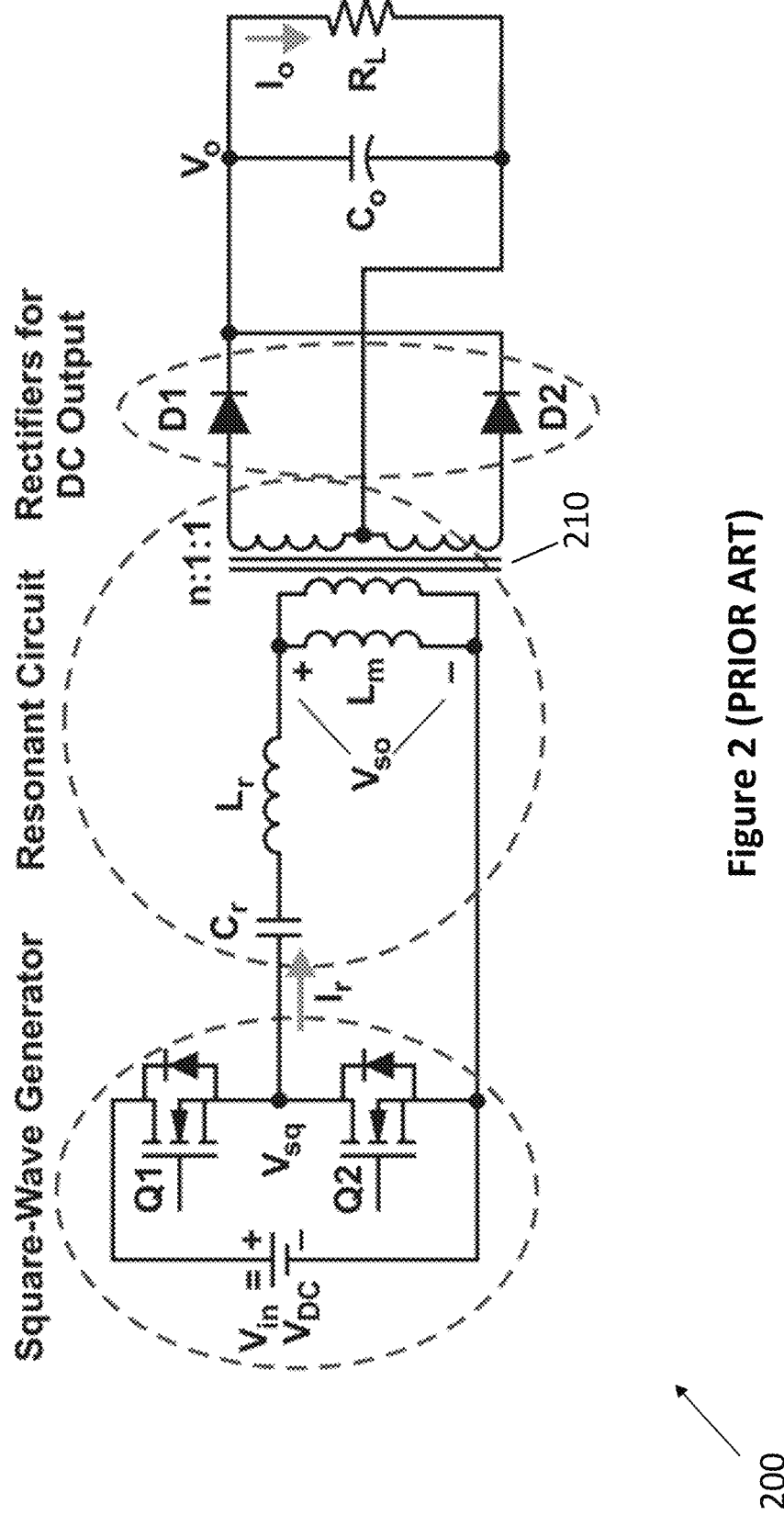
FIG. 2 is a diagram of a LLC circuit according to the prior art.

FIG. 2 illustrates an LLC converter circuit from the prior art from Hong Huang; "Designing an LLC Resonant Half-Bridge Power Converter" 2010 Texas Instruments Power Supply Design Seminar SEM1900, Topic 3 TI Literature Number: SLUP263. An LLC is a type of resonant converter. The example presented in FIG. 2 is a half-bridge LLC topology. The circuit 200 is split into three sections that include a Square-Wave Generator, a Resonant Circuit section, and a pair of Rectifiers for DC Output section.

The Square-Wave Generator is composed of two switches Q1 and Q2 which are coupled to the positive and negative terminals of the input Vin. The switches can be, for example, metal-oxide semiconductor field-effect transistors (MOS-FETs). The switches Q1 and Q2 are coupled to the Resonant Circuit which is comprised of a capacitor Cr, two inductors Lr and Lm and a transformer 210.

The capacitor Cr and the resonant inductor Lr form a resonant tank and are designed to resonate at a specific frequency, f$_r$, also called the resonant frequency and which is determined by the values of Cr and Lr. The magnetising inductor Lm is coupled in parallel to the primary-side winding of transformer 210. The secondary side winding of 210 is coupled to the Rectifiers for DC Output which is comprised of two diodes in parallel D1 and D2 which are connected to the output Vo of the circuit 200. The Square-Wave generator is used to switch the DC input voltage Vin into an AC waveform which is then fed to the Resonant Circuit. The Resonant Circuit acts as a voltage amplifier and can scale the voltage up (boost) or down (buck). The transformer in the Resonant Circuit transfers the energy from the input side to the output side of the converter. In the output side of the converter is the Rectifiers for DC Output which convert the signal into a stable DC output.

The converter 200 shown in FIG. 2 operates with a zero voltage switching (ZVS) driver which controls the switches Q1 and Q2. The driver works in such a way that the switches are turned on or off only when the voltage is zero. This reduces the switching losses that can be experienced with a hard-switching technique such as the one employed for the converter 100 of FIG. 1 and can improve efficiency. The ZVS driver comprises a control circuit which is coupled to the Resonant Circuit of the LLC converter. The control circuit senses the feedback current of the Resonant Circuit and controls the timing of the switches Q1 and Q2 to ensure that they only turn on and off when the voltage is zero this ensures that the resonant capacitor Cr is properly charged and discharged.

Whilst the LLC control strategy is more efficient, the circuit 200 presents many limitations. Firstly, it is a more complex topology than the converter presented in FIG. 1. The LLC converter also has more components and therefore the circuit occupies a larger area and incurs higher manufacturing costs. The requirement of a transformer in the circuit can also result in winding power losses hence reducing the capabilities of the converter.

FIG. 3 is a flow chart illustrating a method of operating a resonant switched capacitor converter according to the present disclosure.

In step 310, a DC-DC power converter is provided. The DC-DC power converter having a ground terminal, an input terminal for receiving an input voltage and an output terminal for providing an output voltage with a target conversion ratio. An embodiment of such a power converter can be seen in FIG. 4. In step 320, the DC-DC power converter is further provided with a coupled inductor having a first winding and a second winding coupled to the output terminal.

The DC-DC power converter is then also provided with a first flying capacitor coupled to a first inductor and the second winding as well as a second flying capacitor coupled to a second inductor and the first winding in step 330. In step 340, an input capacitor coupling the input terminal to the ground terminal and an output capacitor coupling the output terminal to the ground terminal are provided.

A network of switches is provided in step 350 and in step 360 the network of switches is driven with a sequence of states, such that the sequence of states form a switching cycle with a first phase and a second phase.

The operation of the DC-DC power converter is such that the power converter will operate over multiple switching cycles, driving the network of switches using with a soft-switching mode during the first phase, and a hard-switching mode during the second phase.

Figure 4A:
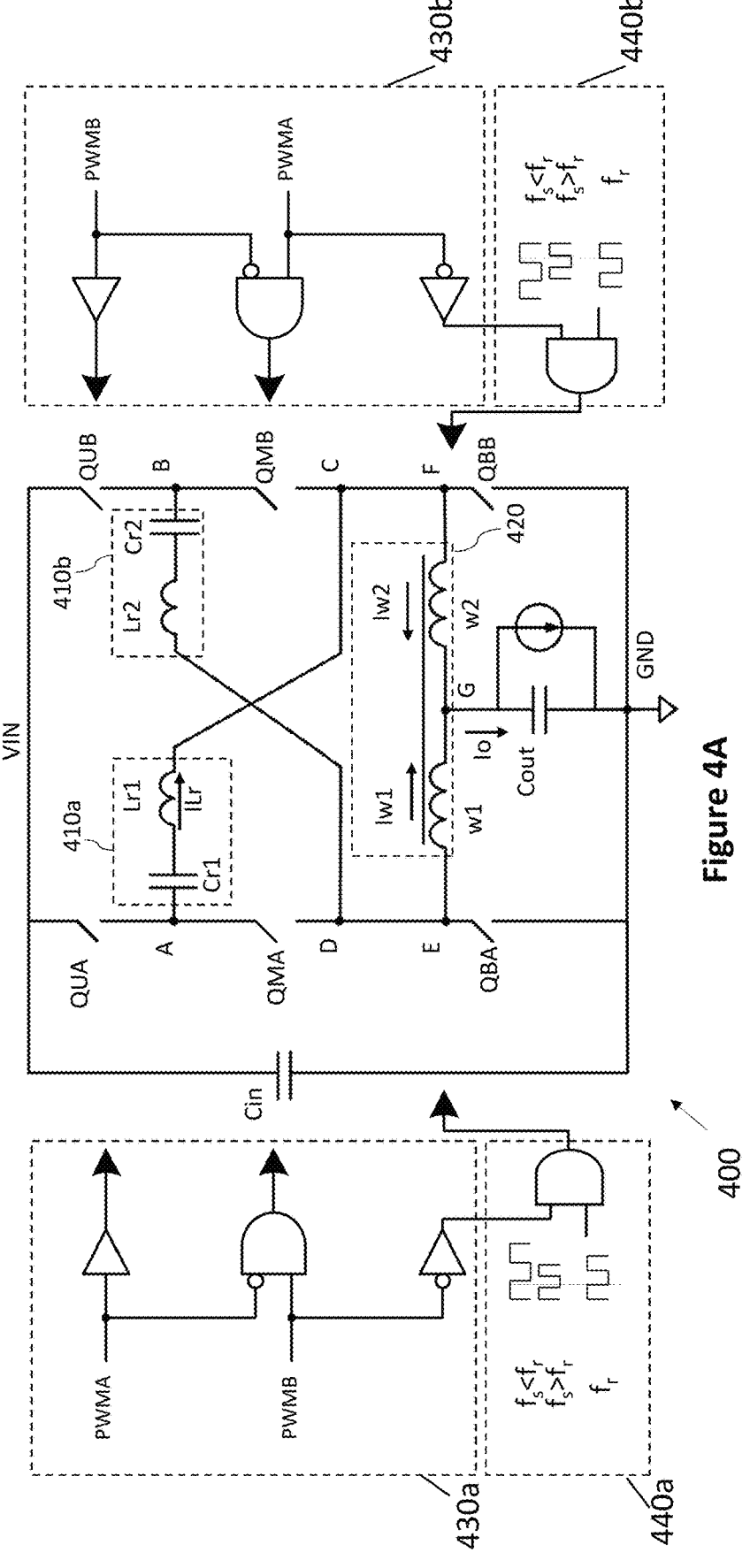
FIG. 4A is a resonant switched capacitor converter circuit according to the disclosure.

FIG. 4A shows a resonant switched capacitor converter (SCC) 400 designed to carry out the method of FIG. 3. The circuit 400 comprises three pairs of switches: QUA and QUB, QMA and QMB, QBA and QBB which are operated by control panels 430a, 430b, 440a and 440b. The circuit 400 further comprises two sets of resonant tanks 410a and 410b, a coupled inductor 420 and an output capacitor Cout. The coupled inductor 420 includes a first winding (w1) magnetically coupled to a second winding (w2).

The switches QUA, QMA and QBA are connected in series, similarly the switches QUB, QMB and QBB are connected in series. The switches are operated so as to charge and discharge the capacitors in order to either step-up (boost) or step-down (buck) the input voltage Vin. The switches can be, for example, field effect transistors (FETs). The first resonant tank 410a is coupled between the output terminal of the first input switch QUA at node A and the output terminal of the second capacitor switch QMB at node C, whilst the second resonant tank 410b is coupled between the output terminal of the second input switch QUB at node B and the output terminal of first capacitor switch QMA at node D. Each one of the resonant tanks 410a and 410b includes a flying capacitor Cr1 and Cr2 coupled to a resonant inductor Lr1 and Lr2, respectively. The coupled inductor 420 is coupled between the input terminals of the ground switches QBA at node E and QBB at node F. The output capacitor Cout is coupled to the coupled inductor 420 at node G between the first and second windings w1 and w2.

The resonant SCC 400 shown in FIG. 4 is designed to operate in two main modes during a single switching cycle. The first mode employs soft-switching techniques and is the primary control operation for operating the switches during the first phase of the switching cycle. This first phase of the switching cycle has two main states, state 1 and state 2.

Figure 4B:
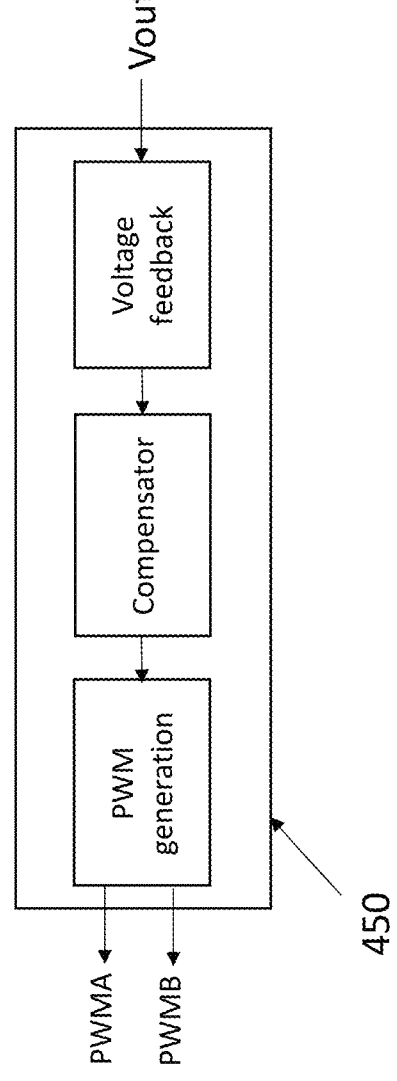
FIG. 4B is a diagram showing a controller circuit for the converter circuit of FIG. 4A.

FIG. 4B shows a circuit 450 for generating pulse width modulation signals PWMA and PWMB received by the control panels 430a and 430b. The circuit 450 is arranged in a feedback loop.

The control panels 430a, 430b, 440a and 440b include a set of logic gates which control each of the pairs of switches QUA and QUB, QMA and QMB and QBA and QBB to switch between state 1 and state 2. The top pair of switches QUA and QUB are coupled to a buffer gate, the middle pair of switches QMA and QMB are coupled to a NAND gate and the bottom pair of switches QBA and QBB are coupled to a NOT gate via an AND gate. The logic gates for the top two pairs of switches receive signals from a generator, which in this example is a pulse width modulation (PWM) generator. The PWM generator generates two signals PWMA and PWMB. The duty cycle and the frequency of the PWMA and PWMB signals may be determined by the output voltage Vout of the circuit 400.

The process for the generation of these signals is seen in FIG. 4B. There is a central controller circuit 450, which receives the output voltage Vout and provides the PWM signals PWMA and PWMB. The central controller circuit 450 is comprised of three modules or circuits: a voltage feedback module, a compensator module and the PWM generator. The voltage feedback module is used to measure the output voltage Vout signal waveform of the circuit 400.

This voltage waveform signal is then fed into the compensator module. The compensator module works to adjust the input waveform signal which will in turn change the PWM signals generated, depending on the gain to be achieved from the circuit 400. If the desired gain is equal to % A, then the signals PWMA and PWMB are generated with a 50% duty cycle and have a frequency equal to the resonant frequency of the resonant tanks 410a and 410b. If the gain needs to be greater than this, then the compensator adapts the signal such that the frequency of the PWMA and PWMB signals is reduced. To achieve a gain lower than % A, the duty cycle of the PWMA and PWMB signals is reduced through the compensator but the frequency is kept to the resonant frequency. Finally, this (adjusted) voltage signal waveform is fed into the PWM generator which generates the two PWM signals that operate the switches.

The switches QBA and QBB are coupled directly to an AND gate which receives two inputs. The first input for the AND gate is the output of the NOT gate which receives signal PWMB for control panel 430a and signal PWMA for control panel 430b. The second input signal received is related to the resonant frequency of the circuit and is referred to as the resonant frequency signal. The AND gate will output a positive signal to close the switch if both gate inputs are positive. For example, in the case of switch QBA, if PWMB is LOW, the NOT gate will transform this signal from a negative to a positive. Therefore the first input of the AND gate will be positive. If the resonant frequency signal is also HIGH then the second input for the AND gate will also be positive and the switch QBA is switched on.

Figure 4C:
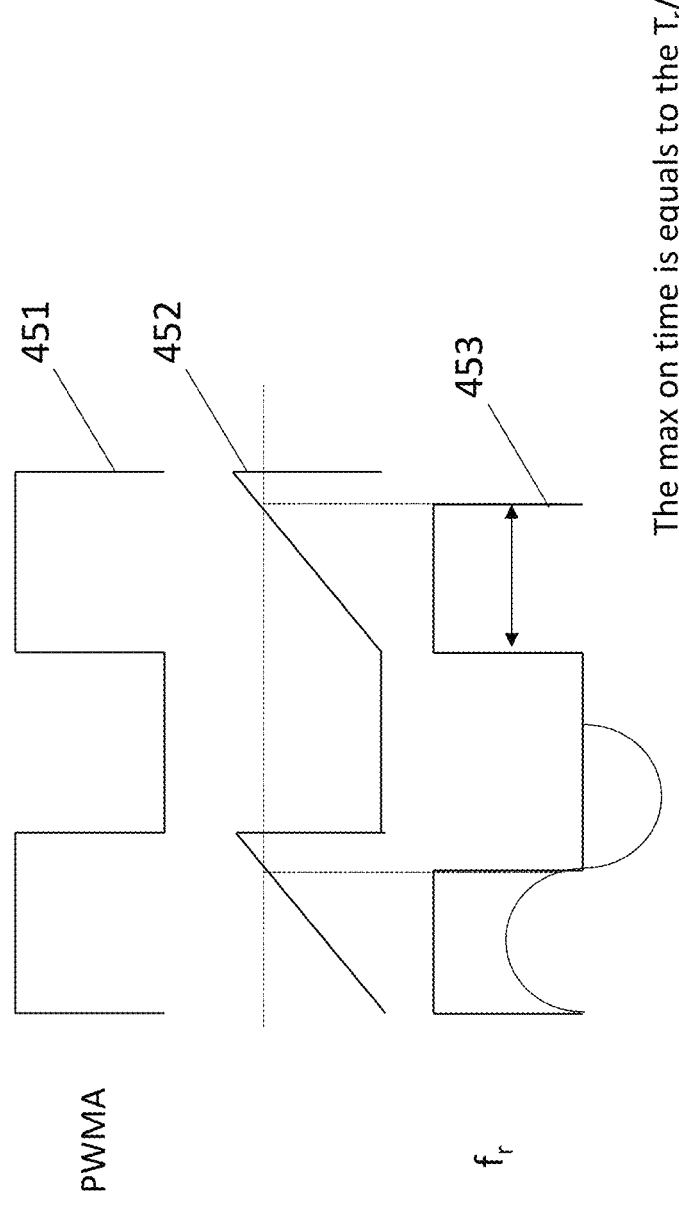
FIG. 4C is a diagram illustrating the generation of a resonant frequency signal.

FIG. 4C is a diagram illustrating the generation of the resonant frequency signal (second input signal). FIG. 4C shows a PWMA signal 451, a ramp signal 452, and the resonant frequency signal 453. The logic signal 453 has a frequency equal to the resonant frequency fr. The maximum on time of the resonant frequency signal is equal to half the resonant period Tr. The resonant frequency signal 453 is used to limit the on time of first signal (PWMA or PWMB) to avoid reversed current through QBA/QBB.

Figure 5B:
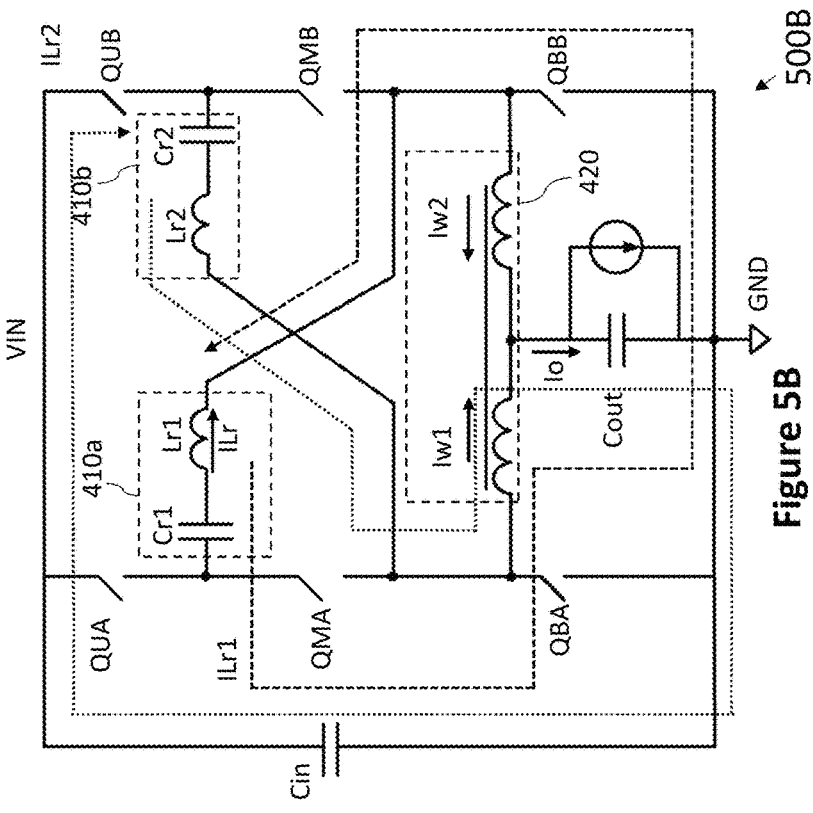
FIG. 5B is a diagram showing the operation of the converter of FIG. 4 during a second state.
Figure 5A:
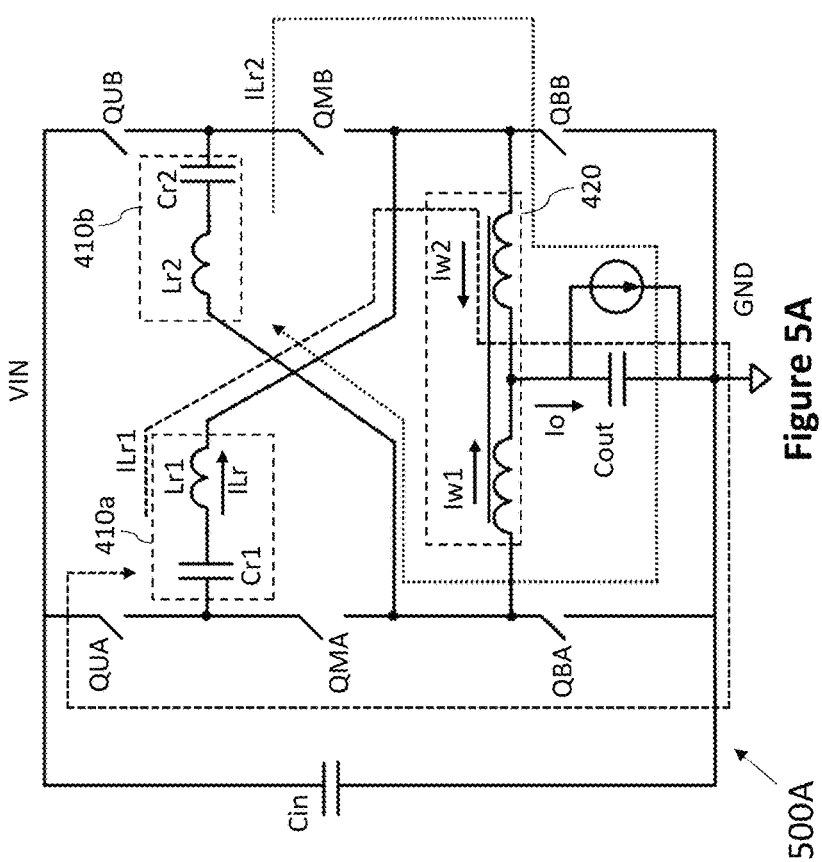
FIG. 5A is a diagram showing the operation of the converter of FIG. 4 during a first state.

FIGS. 5A and 5B show the operation of the converter of FIG. 4 during the first state, and second state, respectively. The converters 500A and 500B are the same as the converter 400 shown in FIG. 4 and as such the same labels have been used for the same components. Converters 500A and 500B also have control panels 430a, 430b, 440a and 440b but they are not shown in these figures.

States 1 and 2 occur once per switching cycle. During the first state, switches QUA, QMB and QBA are closed (turned on) whilst QUB, QMA and QBB are open (turned off). Therefore the PWMA signal is HIGH whilst the PWMB signal is LOW during this state. There are two current paths through the circuit as shown in FIG. 5A. The first current path ILr1 couples the input terminal to the ground GND via the first resonant tank 410a, the second winding w2 of the coupled inductor 420 the output capacitor Cout. The ground is coupled back to the input terminal via the input capacitor Cin. The second current path ILr2 couples GND to GND via the second resonant tank 410b, the second winding w2 of 420 and Cout. The path ILr1 is charging the first resonant tank 410a whilst path ILr2 is charging the output capacitor Cout from the energy stored in the second resonant tank 410b. There is also a third current path not shown in FIG. 5A which also couples GND to GND via the first winding w1 of 420 and Cout. The output current Io has therefore three components: i) 25% of Io arises from the path QUA/Cr1/Lr1/w2/load; ii) 25% of Io arises from the path Cr2/Lr2/w2/QBA and iii) 50% of Io arises from the path w1/QBA.

During the second state, the switches QUA, QMB and QBA are now open and the switches QUB, QMA and QBB are closed. Therefore in this state signal PWMA is LOW whilst signal PWMB is HIGH. There are again two current paths through the system as can be seen in FIG. 5B. The first path ILr1 couples GND to GND through the first resonant tank 410a, the first winding w1 of 420 and Cout. The second current path ILr2 couples the input terminal to GND via the second resonant tank 410b, the first winding w1 of 420 and Cout. The ground is coupled back to the input terminal via the input capacitor Cin. The path ILr2 is charging the second resonant tank 410b whilst path ILr1 is charging the output capacitor from the energy stored in the first resonant tank 410a. There is also a third current path not shown in FIG. 5B which also couples GND to GND via the second winding w2 of 420 and Cout. The output current Io has therefore three components: i) 25% of Io arises from the path QUB/Cr2/ Lr2/w1/load; ii) 25% of Io arises from the path Cr1/Lr1/ w1/load/QBB and iii) 50% of Io arises from the path w2/QBB. The output current, Io, split into each of its component parts is shown in FIG. 6D which shows the waveform of the output current.

During this first phase which is comprised of states 1 and 2 as shown in FIGS. 5A and 5B, the network of switches is operated in a soft-switching mode through the use of the resonant tanks. The resonant tanks 410a and 410b operate at a resonant frequency given by:

$$f_r = \frac{1}{2\pi\sqrt{4L_r 2C_r}}$$

where $L_r$ and $C_r$ are the values of the resonant inductors and flying capacitors that form the resonant tanks 410a and 410b. The values of the flying capacitors and resonant inductors are chosen in such a way that the resonant frequency is similar to the desired switching frequency. Due to the implementation of two resonant tanks, different switches in the network are operated under a different soft-switching mode. The switches QUA, QUB, QMA and QMB are operated under the zero voltage switching (ZVS) mode such that when the voltage measured across these switches is zero or close to zero they switch off. The switches QBA and QBB are operated under the zero current switching (ZCS) mode such that when the current across these switches is zero or close to zero they switch off.

Figures 6A, 6B, 6C:
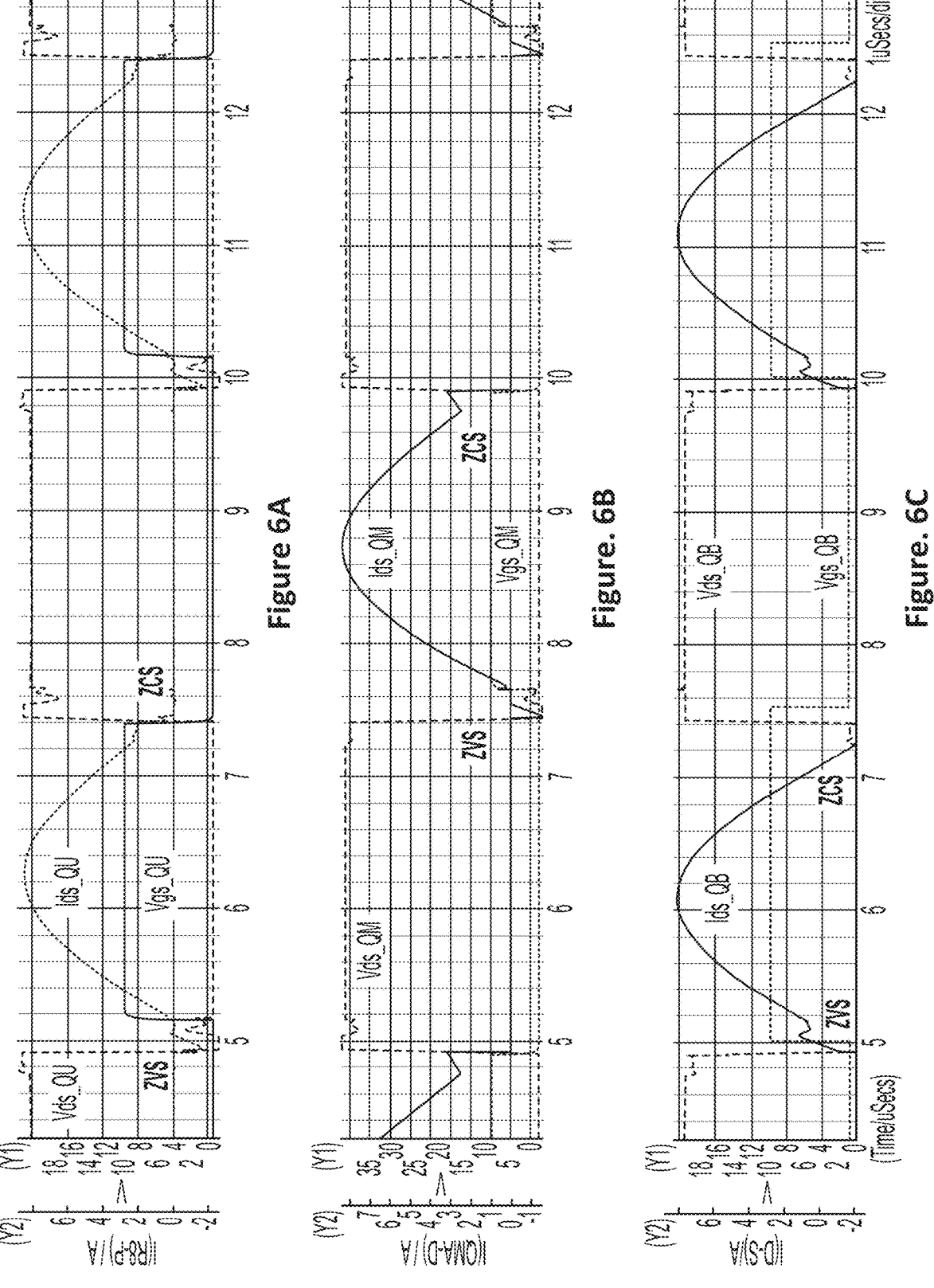
FIGS. 6A-6E are waveform diagrams illustrating the operation of the converter of FIG. 4.
Figures 6D, 6E:
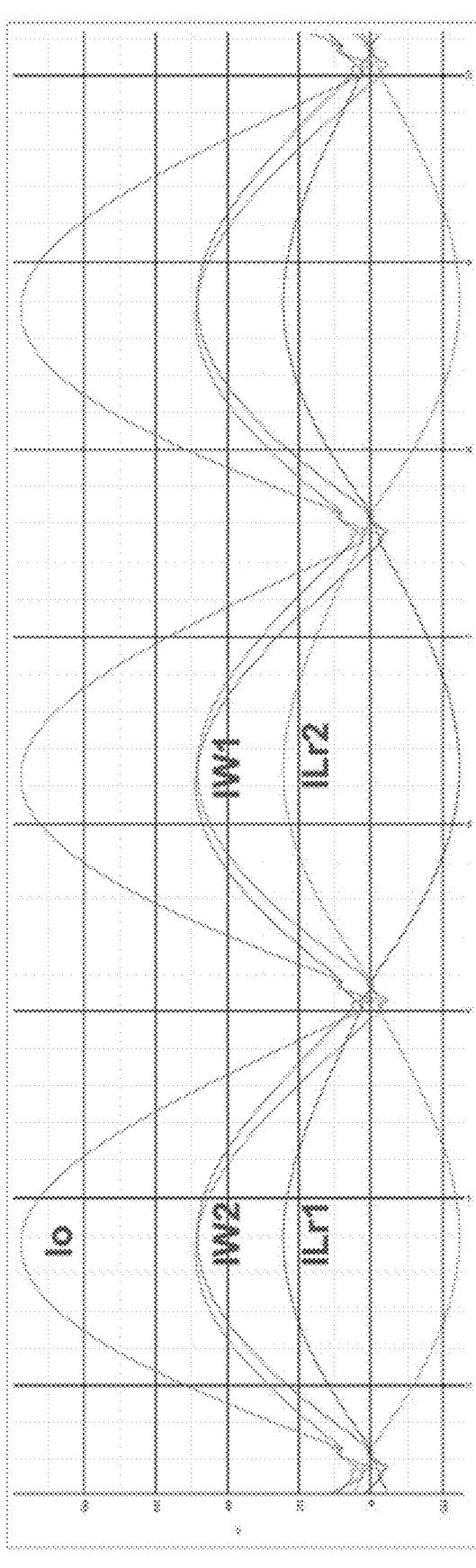

FIGS. 6A-6C are waveform diagrams illustrating the operation of the converter of FIG. 4A. FIG. 6A shows the current Ids_QU and voltages Vds_QU, Vgs_QU through the pairs of switches QUA, QUB. FIG. 6B shows the current Ids_QM and voltages Vds_QM, Vgs_QM through the pairs of switches QMA, QMB. FIG. 6C shows the current Ids_QB and voltages Vds_QB, Vgs_QB through the pairs of switches QBA, QBB. Highlighted in each of the panels are the points in time where the switches experience zero voltage or zero current.

The second phase of the switching cycle occurs during deadtime when the controller operating the network of switches signals for all the switches to be switched off. In other words, when the voltage across the switches QUA, QUB, QMA and QMB are zero or close to zero and the current across the switches QBA and QBB are zero or close to zero. The converter 400 during the second phase of the switching cycle changes the control operation for operating the network of switches to a hard-switching mode. The second phase of the switching cycle is comprised of two states, referred to as the third state (state 3) and the fourth state (state 4), for regulating the output current Io of the converter.

Figures 7A, 7B:
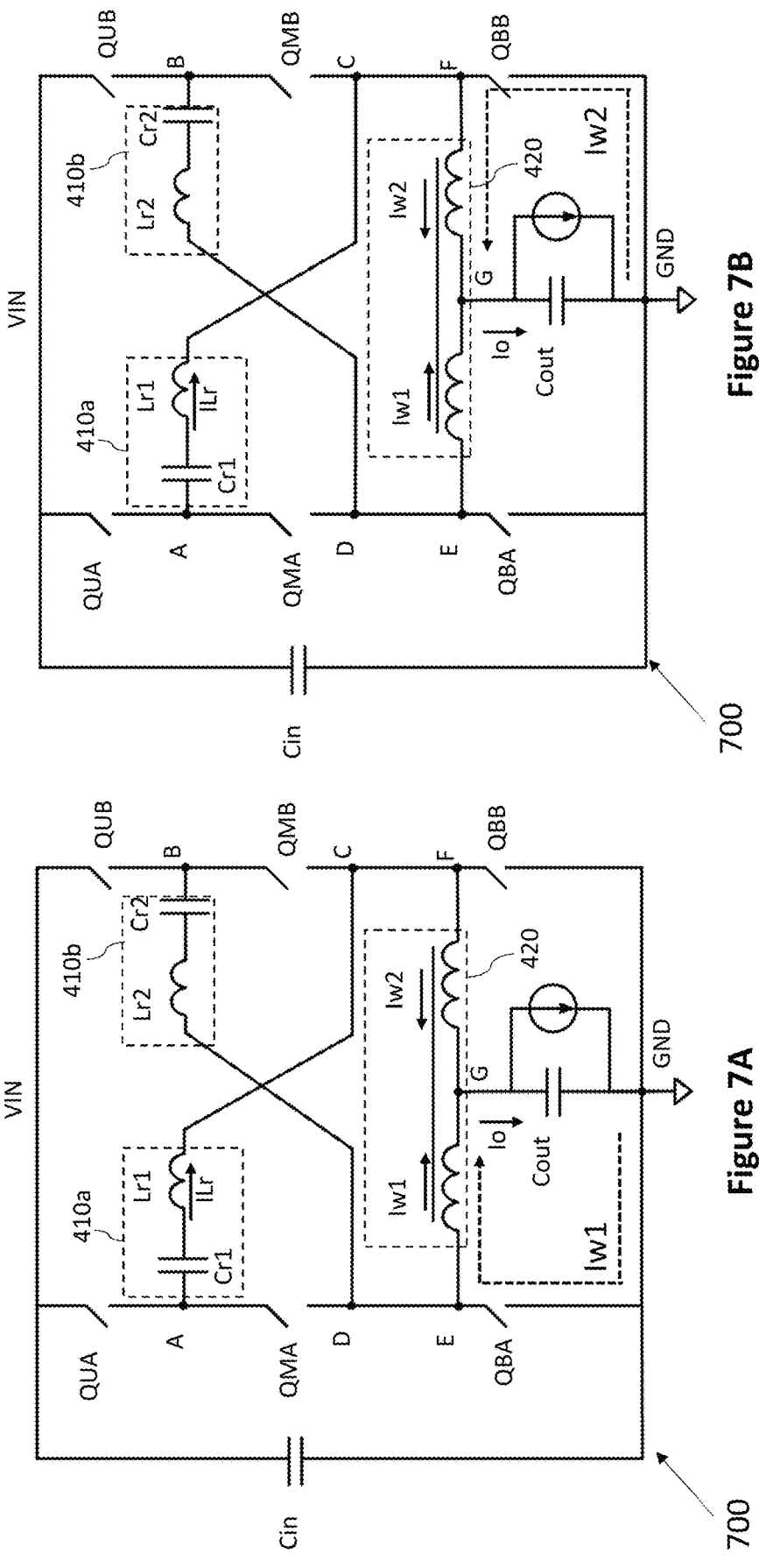
FIG. 7A is a diagram showing the operation the converter of FIG. 4 during a third state.
FIG. 7B is a diagram showing the operation the converter of FIG. 4 during a fourth state.

FIG. 7A shows the current path in the converter 400 during the third state of operation of the converter shown in FIG. 4A. The converter 700 is the same as the one shown in FIG. 4A and hence the same labels have been used for the same components. The switches in converter 700 are also operated by the same control panels 430a, 430b, 440a and 440b but they are not shown in this figure. During state 3, only the bottom switch QBA is on, while the other remaining switches are off. There is a current path Iw1 which free-wheels about GND via the first winding w1 of the coupled inductor 420, the output capacitor Cout and the switch QBA. The current Iw1 flows clockwise through w1.

FIG. 7B shows the current path in the converter 400 during the fourth state of operation of the converter shown in FIG. 4A. During state 4, only the bottom switch QBB is on while the other remaining switches are off. There is a second current path Iw2 which freewheels about GND via the second winding w2 of 420, Cout and the switch QBB. The current Iw2 flows anticlockwise through w2.

In the second phase of the switching cycle, the only switches being operated by the controller are the bottom switches in a hard-switching mode. The hard-switching mode employed in this case is a pulse width modulation (PWM) control mode. When the PWM signal is high, the switch QBA is closed (state 3) when the signal is low the switch QBB is closed (state 4). The duty cycle of the PWM signal is regulated in order to prevent currents ILr1 and ILr2 from reversing during this phase of the switching cycle. If the switches QBA and QBB are switched on and no current is flowing through them, then the current (Iw1 or Iw2) is reversed. The PWM signal ensures that the switches QBA and QBB are off when the current through them is zero. Once the deadtime is over, the converter resumes operating in the soft-switching mode described previously.

The switched capacitor converter (SCC) of the disclosure can operate in both a resonant mode (soft switching) as well as a PWM mode (hard switching). This provides a higher efficiency over the standard SCC and LLC circuits. It also and increases power density and improves regulation accuracy.

Figure 8C:
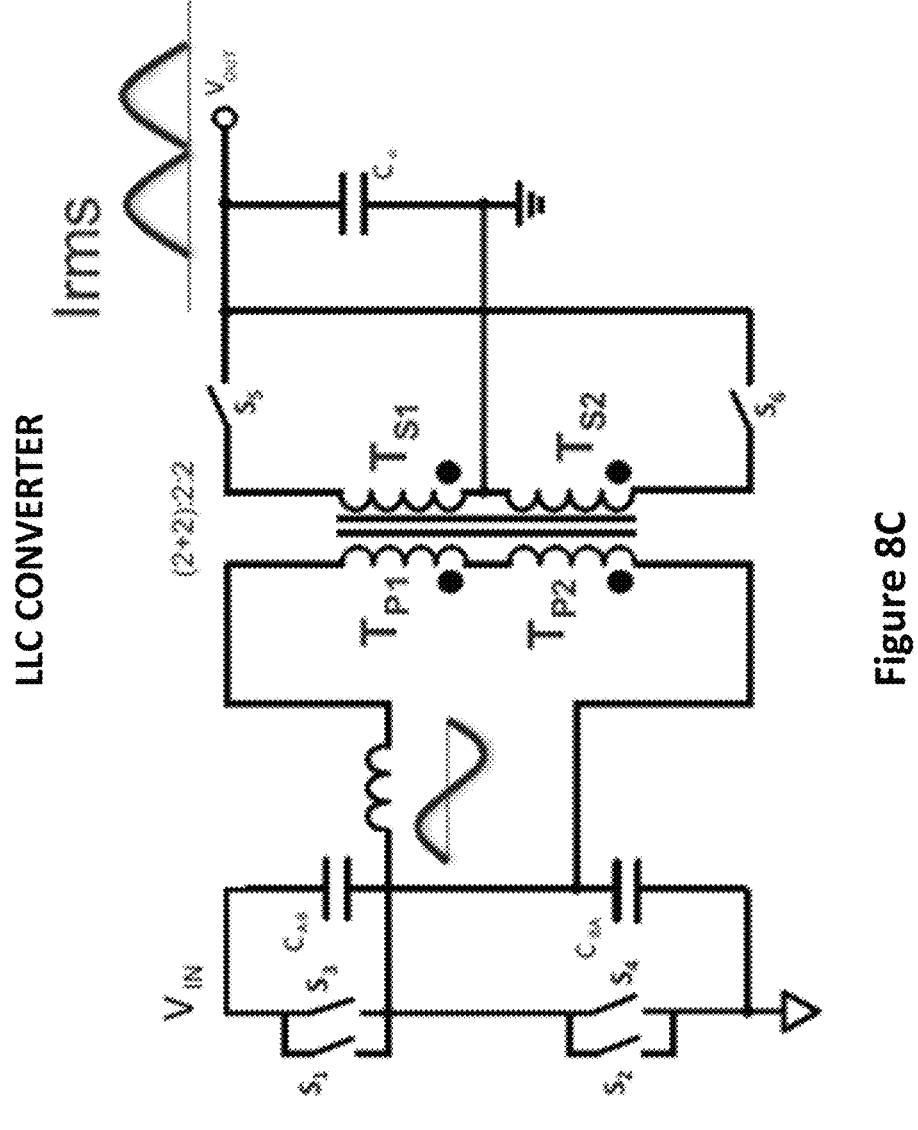
Figure 8B:
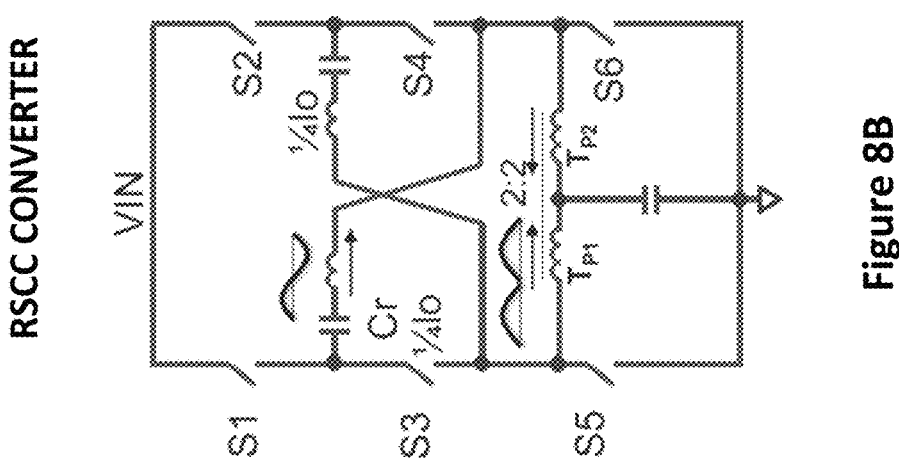

FIG. 8A shows a table comparing the performance of the resonant SCC RSCC shown in FIG. 8B (same as FIG. 4A but with different labels) with the performance of an LLC shown in FIG. 8C.

When comparing the voltage stresses imparted on the switches, the resonant SCC of the present disclosure imparts less voltage stress on QUA and QUB compared with the LLCs of the prior art. Regarding losses, the converter 400 experiences less winding loss and less power loss.

Figure 9:
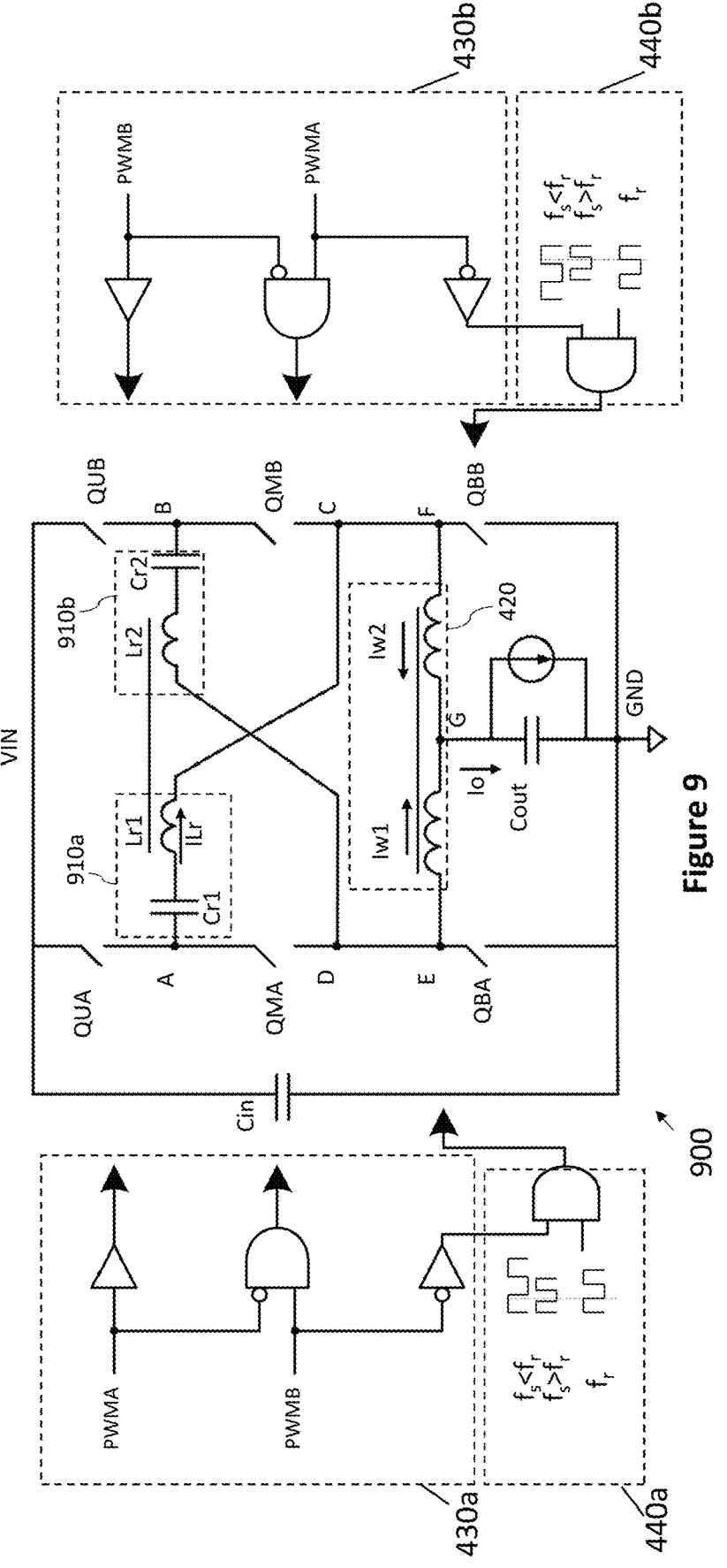
FIG. 9 is an alternative embodiment of a resonant switched capacitor converter according to the present disclosure.

FIG. 9 shows an alternative embodiment of the resonant SCC shown in FIG. 4. Many of the components in converter 900 are the same as the ones in converter 400 and so the same labels have been used and their purpose will not be repeated here for brevity.

In the converter 900 of FIG. 9, the resonant inductors Lr1 and Lr2 in the resonant tanks 910a and 910b are magnetically coupled together. The converter 900 is operated in the same way as the one shown in FIG. 4A, but the presence of the coupled inductor in the resonant tanks means that the converter can be made to a smaller size. The values of the inductors Lr1 and Lr2 in the resonant tanks can be reduced to half the value they would be in the converter 400 thus reducing the size of the components being used and saving area and manufacturing costs. Furthermore, magnetically coupling the two resonant tanks 910a and 910b together enforces the symmetrical and current balance of the two channels.

Figure 10:
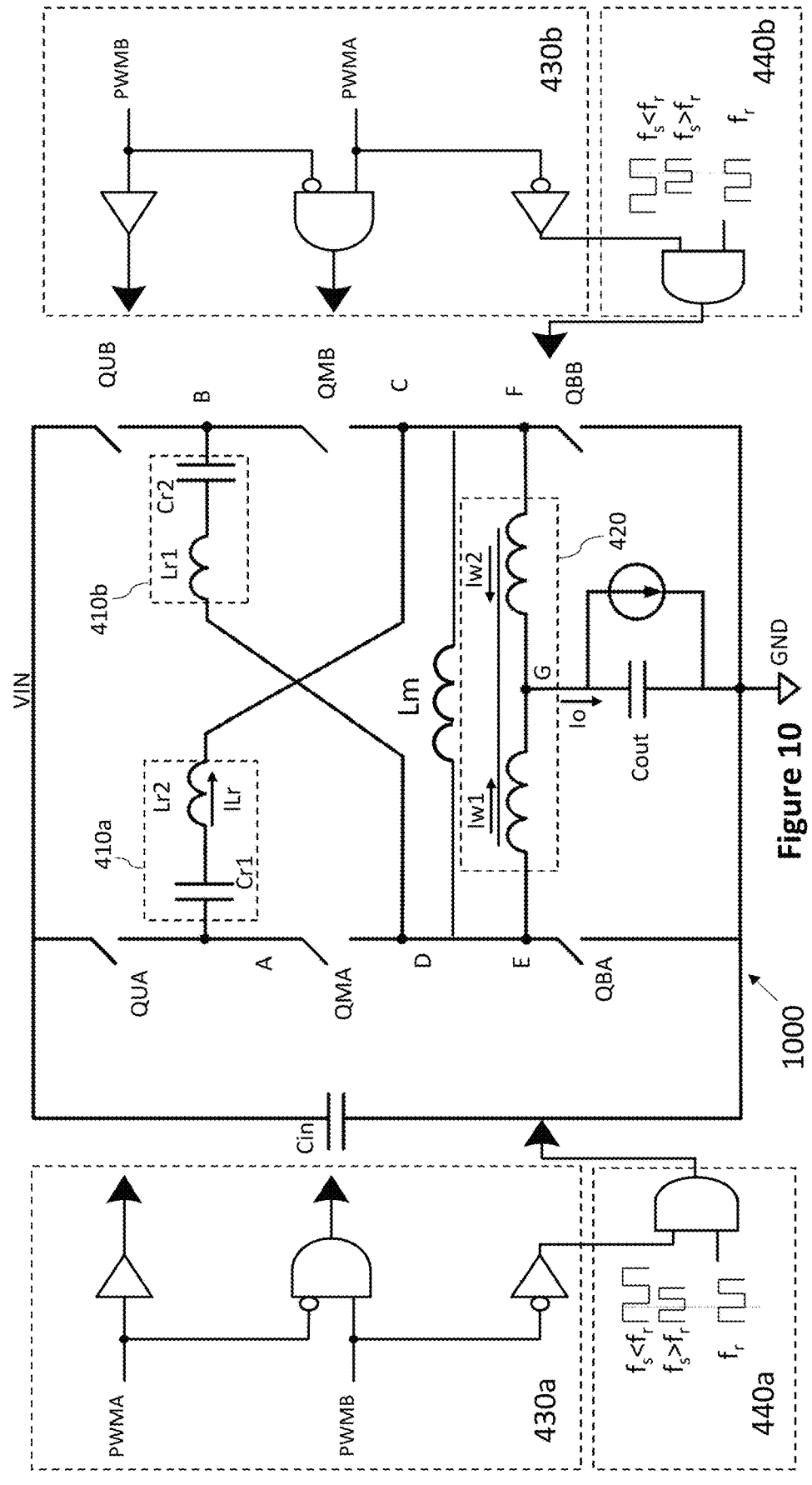
FIG. 10 is another alternative embodiment of a resonant switched capacitor converter according to the present disclosure.

FIG. 10 shows another alternative embodiment of the resonant SCC shown in FIG. 4A. Many of the components in converter 1000 are the same as the ones in converter 400 and so the same labels have been used and their purpose will not be repeated here for brevity.

In the converter 1000 of FIG. 10, an additional inductor Lm has been added to the circuit. This magnetising inductor Lm is coupled in parallel across the coupled inductor 420. The converter 1000 is operated in the same way as the one shown in FIG. 4A but the inductor Lm helps control the gain of the converter by either increasing or decreasing the gain depending upon whether the converter is being used as a boost or a buck converter. When the converter 1000 is being operated at the full load range, the presence of the inductor Lm allows for the realization of the ZVS.

A skilled person will therefore appreciate that variations of the disclosed arrangements are possible without departing from the disclosure. Accordingly, the above description of the specific embodiments is made by way of example only and not for the purposes of limitation. It will be clear to the skilled person that minor modifications may be made without significant changes to the operation described.

The invention claimed is:

1. A DC-DC power converter having a ground terminal, an input terminal for receiving an input voltage and an output terminal for providing an output voltage with a target conversion ratio, the DC-DC power converter comprising:
   a coupled inductor having a first winding and a second winding coupled to the output terminal;
   a first flying capacitor coupled to a first inductor and to the second winding;
   a second flying capacitor coupled to a second inductor and to the first winding;
   an input capacitor coupling the input terminal to the ground terminal;
   an output capacitor coupling the output terminal to the ground terminal;
   a network of switches; and
   a driver adapted to drive the network of switches with a sequence of states during a drive period, wherein the sequence of states forms a switching cycle comprising a first phase and a second phase,
   wherein:
      the first phase of the switching cycle comprises a first state and a second state;
      in the first state of the first phase, the input terminal is coupled to the input terminal via a path comprising the first flying capacitor, the first inductor, the second winding, the output capacitor and the input capacitor; and the ground terminal is coupled to the ground terminal via two paths, a first path comprising the second inductor, the second flying capacitor, the second winding, and the output capacitor, and a second path comprising the first winding and the output capacitor;
      in the second state of the first phase, the input terminal is coupled to the input terminal via a path comprising the second flying capacitor, the second inductor, the first winding, the output capacitor and the input capacitor; and the ground terminal is coupled to the ground terminal via two paths a first path comprising the first inductor, the first flying capacitor, the first winding, and the output capacitor, and a second path comprising the second winding and the output capacitor;
      the second phase of the switching cycle comprises a third state and a fourth state;
      in the third state of the second phase, the ground terminal is coupled to the ground terminal via a path comprising the first winding and the output capacitor;

in the fourth state of the second phase, the ground terminal is coupled to the ground terminal via a path comprising the second winding and the output capacitor;
   the network of switches comprises:
      a first input switch to couple the first flying capacitor to the input terminal;
      a second input switch to couple the second flying capacitor to the input terminal;
      a first capacitor switch to couple the first flying capacitor to the first winding;
      a second capacitor switch to couple the second flying capacitor to the second winding;
      a first ground switch to couple the first winding to the ground terminal; and
      a second ground switch to couple the second winding to the ground terminal,
      wherein each switch in the network of switches is configured to be in either an on-state or an off-state; and
   in the third state of the second phase, the first ground switch is in the on-state and the other remaining switches are in the off-state.

2. The DC-DC power converter as claimed in claim 1, wherein in the first state the first input switch, the second capacitor switch and the first ground switch are in the on-state, while the second input switch, the first capacitor switch and the second ground switch are in the off-state.

3. The DC-DC power converter as claimed in claim 1, wherein in the second state, the first capacitor switch, the second input switch, and the second ground switch are in the on-state and the first input switch, the second capacitor switch and the first ground switch are in the off-state.

4. The DC-DC power converter as claimed in claim 1, wherein in the fourth state the second ground switch is in the on-state and the other remaining switches are in the off-state.

5. The DC-DC power converter of claim 1 wherein the first flying capacitor coupled to the first inductor forms a first resonant tank; and wherein the second flying capacitor coupled to the second inductor forms a second resonant tank.

6. The DC-DC power converter of claim 1 wherein the first inductor and the second inductor form a coupled inductor.

7. The DC-DC power converter of claim 1 further comprising a third inductor connected in parallel to the coupled inductor.

8. The DC-DC power converter as claimed in claim 1, wherein the driver comprises at least a first control panel and a second control panel, the first control panel being configured to control a first portion of the network of switches using at least one pulse width modulation (PWM) signals, and the second control panel being configured to control a second portion of the network of switches using at least one resonant frequency associated with the DC-DC power converter.

9. The DC-DC power converter as claimed in claim 1, wherein the driver is configured to operate in a first mode during the first phase and a second mode during the second phase, wherein the first mode is a soft-switching mode and the second mode is a hard-switching mode.

10. The DC-DC power converter as claimed in claim 9, wherein the soft-switching mode is a resonant mode comprising at least one of a zero voltage and a zero current switching mode.

11. The DC-DC power converter as claimed in claim 10, wherein the driver is configured to drive the first input switch, the second input switch, the first capacitor switch, and the second capacitor switch using the zero voltage switching; and the first ground switch and the second ground switch using the zero current switching mode.

12. The DC-DC power converter as claimed in claim 10, wherein the hard-switching mode comprises a pulse width modulation mode.

13. The DC-DC power converter as claimed in claim 10, wherein the driver comprises a controller having a compensator circuit coupled to a pulse width modulation generator configured to generate two pulse width modulation signals, and wherein the compensator circuit is configured to receive the output voltage and provide a compensated output voltage signal to the pulse width modulation generator.

14. A method of operating a DC-DC power converter having a ground terminal, an input terminal for receiving an input voltage and an output terminal for providing an output voltage with a target conversion ratio; the method comprising:

providing a coupled inductor having a first winding and a second winding coupled to the output terminal;

providing a first flying capacitor coupled to a first inductor and the second winding;

providing a second flying capacitor coupled to a second inductor and the first winding;

providing an input capacitor coupling the input terminal to the ground terminal;

providing an output capacitor coupling the output terminal to the ground terminal;

providing a network of switches;

driving the network of switches with a sequence of states, wherein the sequence of states forms a switching cycle with a first phase and a second phase, wherein:

the first phase of the switching cycle comprises a first state and a second state;

in the first state of the first phase, the method further comprising coupling the input terminal to the input terminal via a path comprising the first flying capacitor, the first inductor, the second winding, the output capacitor and the input capacitor; and the ground terminal is coupled to the ground terminal via two paths, a first path comprising the second inductor, the second flying capacitor, the second winding, and the output capacitor, and a second path comprising the first winding and the output capacitor;

in the second state of the first phase, the method further comprising coupling the input terminal to the input terminal via a path comprising the second flying capacitor, the second inductor, the first winding, the output capacitor and the input capacitor; and the ground terminal is coupled to the ground terminal via two paths a first path comprising the first inductor, the first flying capacitor, the first winding, and the output capacitor, and a second path comprising the second winding and the output capacitor;

the second phase of the switching cycle comprises a third state and a fourth state;

in the third state of the second phase, the method further comprising coupling the ground terminal to the ground terminal via a path comprising the first winding and the output capacitor;

in the fourth state of the second phase, the method further comprising coupling the ground terminal to the ground terminal via a path comprising the second winding and the output capacitor;

the network of switches comprises:

a first input switch to couple the first flying capacitor to the input terminal;

a second input switch to couple the second flying capacitor to the input terminal;

a first capacitor switch to couple the first flying capacitor to the first winding;

a second capacitor switch to couple the second flying capacitor to the second winding;

a first ground switch to couple the first winding to the ground terminal; and a second ground switch to couple the second winding to the ground terminal;

the method further comprising configuring each switch in the network of switches to be in either an on-state or an off-state; and in the third state of the second phase, the method further comprising configuring the first ground switch to the on-state and maintaining the other remaining switches in the off-state.

15. The method as claimed in claim 14, wherein driving the network of switches comprises:

controlling a first portion of the network of switches using at least one pulse width modulation (PWM) signals; and controlling a second portion of the network of switches using at least one resonant frequency associated with the DC-DC power converter.

16. The method as claimed in claim 14 comprising driving the network of switches using with a soft-switching mode during the first phase, and a hard-switching mode during the second phase.

17. The method as claimed in claim 16, wherein the soft-switching mode is a resonant mode, and the hard-switching mode is a pulse width modulation mode.

* * * * *